United States Patent [19]

Gale

[11] Patent Number: 4,550,815

[45] Date of Patent: Nov. 5, 1985

[54] CLUTCH WEAR INDICATOR

[75] Inventor: Ronald J. Gale, Hornchurch, United Kingdom

[73] Assignee: Ford Motor Company, Dearborn, Mich.

[21] Appl. No.: 546,147

[22] Filed: Oct. 27, 1983

[30] Foreign Application Priority Data

Dec. 24, 1982 [GB] United Kingdom ................. 8236770

[51] Int. Cl.[4] .............................................. F16D 23/00
[52] U.S. Cl. ................................ 192/30 W; 188/1.11; 192/111 R; 200/61.4; 340/52 R
[58] Field of Search ............ 192/30 W, 111 R, 111 A, 192/111 B, 111 T; 188/1.11; 200/61.4; 340/52 R, 52 A; 116/208

[56] References Cited

U.S. PATENT DOCUMENTS

| 2,146,357 | 2/1939 | Schweikle | 200/61.4 |
| 2,425,985 | 8/1947 | Blomberg | 192/30 W X |
| 3,469,666 | 9/1969 | Goode | 192/30 W |
| 3,982,614 | 9/1976 | Bisaillon | 192/30 W |
| 4,013,143 | 3/1977 | Juhasz | 188/1.11 |
| 4,231,012 | 10/1980 | Volan et al. | 188/1.11 X |
| 4,508,196 | 4/1985 | Jamon | 116/208 X |

Primary Examiner—William E. Tapolcai
Attorney, Agent, or Firm—Peter D. McDermott; Roger L. May

[57] ABSTRACT

A wear indicator for an automative driveline clutch comprises a base 20 fixed to the clutch housing 10, and a microswitch 16 mounted on a carrier 30. The carrier 30 is set in position by the first full disengagement movement of the clutch lever 12. The length of the aperture 32 is such that the lever 12 engages the microswitch 16 when the clutch linings are worn.

7 Claims, 3 Drawing Figures

CLUTCH WEAR INDICATOR

This invention relates to a wear indicator suitable for automatic drive-line clutches.

Many modern motor cars are equipped with warning systems for informing the car driver of low liquid levels (fuel, oil, coolant, etc.), malfunctioning of bulbs and brake pad wear, but satisfactory clutch wear warning devices have not yet been developed.

Contact devices embedded in the clutch facings similar to those used in brake pads cannot be used because of difficulties of making connections to the rotating clutch disc. The position of the clutch actuating lever does not give a reliable indication of clutch wear because manufacturing tolerances cause large variations in the position of the clutch level relative to the housing when the clutch facings are warn.

According to the present invention, there is provided a clutch wear indicator comprising a base and contact means arranged to be engaged by the clutch actuating lever when the lever reaches a position indicative of warn clutch linings, characterised in that the contact means is fixed to a carrier slidably mounted on the base for movement by the clutch actuating lever upon initial full release movement of the clutch actuating lever to a position such that the contact means is spaced from the clutch actuating lever by a distance corresponding to the normal wear of the clutch lining.

The invention will now be described further, by way of example, with reference to the accompanying drawings, in which.

Figure 1:
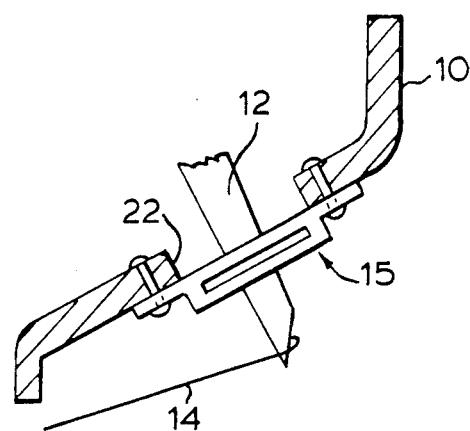
FIG. 1 is a diagrammatic fragmentary plan view of a clutch having a wear indicator embodying the invention.
Figure 2:
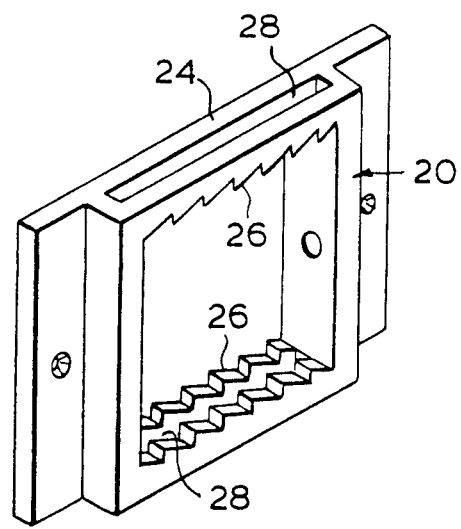
FIG. 2 is a perspective view of the base of the wear indicator shown in FIG. 1.
Figure 3:
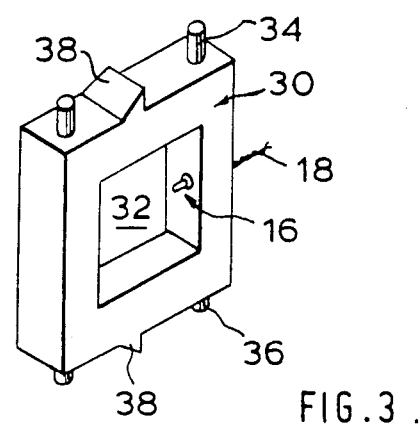
FIG. 3 is a perspective view of the carrier and contact means of the wear indicator of FIG. 1.

In FIG. 1, an automobile driveline clutch includes a housing 10 and a clutch actuating lever 12. The lever 12 is operated by a clutch control cable 14.

A wear indicator 15 is mounted on the housing 10 and detects the position of the clutch release lever, this being indicative of excessive wear requiring replacement of the clutch facings.

The wear indicator includes contact means comprising a microswitch 16 connected by leads 18 in circuit with a battery and a warning light (not shown). The microswitch 16 is mounted on the carrier frame for engagement by the clutch release lever 12.

A rectangular base frame 20 is fixed, for example by rivetting, to the clutch housing around the aperture 22 through which projects the clutch release lever 12. The larger sides 24 of the base frame extend parallel to the direction of movement of the outer end of the lever 12 and are formed on their inner surfaces with ratchet teeth 26. Each side 24 is formed with longitudinally extending slot 28.

A rectangular carrier frame 30 has an aperture 32 to receive the clutch release lever 12. The carrier frame 30 fits slidably in the base frame 20 and has upper and lower guide projections 34, 36 which engage in the slot 28 to guide the carrier frame for movement along the base frame. Ratchet teeth 38 on the upper and lower surfaces of the carrier frame engage the ratchet teeth 26 of the base frame.

The carrier frame or base frame, or both are made of resilient material and the mutually engaging ratchet teeth permit movement of the carrier frame in the release direction of the clutch but prevent return movement. The device can be reset, for example when a worn clutch plate has been replaced, by inserting a tool through the slot 28 to disengage the ratchet teeth.

In operation, the first full depression of the vehicle clutch pedal moves the release lever to a fully released position. The clutch release lever engages surface 40 of the carrier frame and displaces it along the ratchet setting the carrier frame in position.

The clutch release lever returns, as the clutch is engaged to a position in which it is spaced from the microswitch by the distance which it will move during full wear of the clutch facings. To achieve this the length of aperture 32 is made equal to the thickness of the clutch release lever plus the wear movement of the lever plus the distance between the engaged position of the lever and the fully disengaged position.

As the clutch facings wear the position of the carrier frame remains fixed and the engaged position of the clutch release lever approaches closer to the microswitch until the clutch is worn sufficiently to require replacement and the lever contacts and closes the microswitch thereby illuminating the warning light.

It should be noted that the ratchet device is not essential since friction between the carrier frame and the base frame can be used to keep the carrier frame in its set position provided that the friction is sufficient to ensure that the carrier frame is not moved by shock and vibration or by forces applied by the release lever sufficient to close the microswitch.

I claim:

1. A clutch wear indicator adapted for use with a clutch which comprises a clutch lining and which is mounted within a clutch housing, wherein a clutch actuating lever operably engages said clutch and extends through an aperture in said clutch housing, said clutch actuating lever being adapted to travel a distance from a clutch release position to a first clutch engaged position corresponding to an unworn clutch lining and a greater distance to a second clutch engaged position corresponding to a substantially worn clutch lining, said clutch wear indicator comprising:

a base mounted to said clutch housing about said aperture, said clutch actuating lever extending through an aperture in said base:

a carrier frame mounted within the aperture of said base via an engagement which permits movement of said carrier frame relative said base in the direction of movement of said clutch actuating lever for clutch release and substantially no movement relative said base in other directions, said clutch actuating lever extending through an aperture in said carrier frame and movable therein from a clutch engaged position at a first end of said aperture to a clutch released position at a second end of said aperture: and contact means mounted to said carrier frame and operably connected to signal means adapted to give a signal upon actuation of said contact means, said contact means being adapted for actuation by contact with said clutch actuating lever:

wherein said carrier frame is movable in said base by movement of said clutch actuating lever to a location at which said contact means is positioned to be in contact with said clutch actuating lever in said clutch engaged position corresponding to a worn clutch lining.

2. A clutch wear indicator as claimed in claim 1, in which the base comprises a frame adapted to fit around the aperture of the clutch housing through which projects the clutch actuating lever.

3. A clutch wear indicator as claimed in claim 2, in which the carrier frame comprises a substantially rectangular frame slidably mounted on the base frame, the clutch actuating lever projecting, in use, through the carrier frame.

4. A clutch wear indicator as claimed in claim 3, in which the contact means is mounted at one end of the carrier frame which is proximate said clutch engaged positions.

5. A clutch wear indicator as claimed in claim 4, in which the distance from the contact means to the opposite inner edge of the carrier frame is equal to the distance moved by the clutch actuating lever from said clutch released position to said clutch engaged position corresponding to a substantially worn clutch lining plus the thickness of the clutch actuating lever measured in the direction of travel of said clutch actuating lever.

6. A clutch wear indicator as claimed in any one of claims 2, 3, 4, 5 and 1, wherein said engagement between the base and the carrier frame comprises a ratchet coupling.

7. A clutch wear indicator as claimed in claim 6, in which said ratchet coupling is disengagable to permit re-positioning of the carrier frame.

* * * * *